UNITED STATES PATENT OFFICE.

GEORGE F. BROTT, OF WASHINGTON, DISTRICT OF COLUMBIA.

ARTIFICIAL FUEL.

SPECIFICATION forming part of Letters Patent No. 266,088, dated October 17, 1882.

Application filed November 18, 1881. Renewed September 25, 1882. (No specimens.)

*To all whom it may concern:*

Be it known that I, GEORGE F. BROTT, a citizen of the United States of America, residing at Washington city, in the District of Columbia, have invented certain new and useful Improvements in Artificial Fuel; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the utilization of straw, chaff, hay, &c., as a fuel; and it consists in reducing the straw, hay, &c., to a comparatively fine state, and mixing the same with peat, turf, or residuum of petroleum for fuel.

In certain sections of this country straw and hay are very abundant and are thrown out and trodden under foot. Many attempts have been made to utilize them as a fuel by twisting into ropes, by disintegrating them and mixing with resinous or other similar inflammable binding material, also by burning the same in variously-devised furnaces, stoves, &c.; but such attempts have not met with much success, owing to the very combustible nature of the material, which burns out and destroys the furnaces, stoves, &c., in a very short time.

According to my invention the straw or hay is cut into short lengths in a straw-cutter, or in any suitable manner, and mixed with peat or turf in a pug-mill, and pressed into any convenient form for use. The machine I prefer to use for this purpose is of special construction, and for which I am about to apply for Letters Patent. The straw or hay, after being cut to the desired size, is subjected to the action of steam, either before or after it is placed in the mixing-mill, for the purpose of softening it and making it more pliable and more readily compacted and shaped into blocks or balls. I mix with a given quantity of the cut straw, chaff, or hay about one-third its weight of peat or turf, with sufficient residuum of petroleum to render the compound more inflammable. The peat or turf not only acts as a binder for the straw, hay, &c., but is of itself a fuel.

In localities where peat is not convenient I may use turf or sod freed from clay. The turf or sod is generally full of roots and other vegetable matter, and will serve not only as a binder, but will be in a great measure consumed as a fuel.

In the large farming districts of the West, where fuel is scarce, my invention will prove of great benefit, and the fuel can be prepared at the same time the thrashing is done by utilizing the thrashing-power to cut and mix the straw with the peat, turf, sod, or other binding material. The chaff, straw, and beards of the grain can all be worked in, so that a farmer, while thrashing his grain, can, with very little expense, at the same time manufacture or prepare his fuel. It is well known that straw, hay, and other like substances are rich in carbon, and possess great heat-producing power; but the great difficulty has been to condense such materials and confine them, so that they will not burn too rapidly. After the straw, chaff, or hay has been properly mixed with the peat, turf, sod, or other like material I compress the same into blocks or balls of any convenient or desired shape and allow them to dry for use.

Having thus described my invention, what I claim, and desire to secure by Letters Patent, is—

An artificial fuel consisting of cut straw, chaff, or hay, and residuum of petroleum, combined with peat, turf, or other like material molded by pressure into suitable blocks, as set forth.

In testimony whereof I affix my signature in presence of two witnesses.

GEORGE F. BROTT.

Witnesses:
W. B. CUDLIP,
THOS. S. TAYLOR.